US00RE45762E

(19) United States
(12) Reissued Patent
Raksha et al.

(10) Patent Number: US RE45,762 E
(45) Date of Reissued Patent: Oct. 20, 2015

(54) PRINTED MAGNETIC INK OVERT SECURITY IMAGE

(71) Applicant: JDS Uniphase Corporation, Milpitas, CA (US)

(72) Inventors: Vladimir P. Raksha, Santa Rosa, CA (US); Cornelis Jan Delst, Fairfax, CA (US); Paul G. Coombs, Santa Rosa, CA (US); Charles T. Markantes, Santa Rosa, CA (US); Alberto Argoitia, Santa Rosa, CA (US)

(73) Assignee: JDS Uniphase Corporation, Milpitas, CA (US)

(21) Appl. No.: 14/038,692

(22) Filed: Sep. 26, 2013

Related U.S. Patent Documents

Reissue of:
(64) Patent No.: 8,025,952
Issued: Sep. 27, 2011
Appl. No.: 11/928,883
Filed: Oct. 30, 2007

U.S. Applications:
(60) Continuation-in-part of application No. 11/415,027, filed on May 1, 2006, now Pat. No. 7,674,501, and a (Continued)

(51) Int. Cl.
*B41M 5/00* (2006.01)
*B41M 3/00* (2006.01)

(Continued)

(52) U.S. Cl.
CPC ..... *B41M 3/005* (2013.01); *B41M 3/148* (2013.01); *B41M 7/0027* (2013.01); *B42D 25/00* (2014.01);

(Continued)

(58) Field of Classification Search
CPC .... B41M 3/005; B41M 7/0027; B41M 3/148; G09F 19/14; G09F 7/04; B42D 15/10; B42D 2033/16; B05D 3/14; B05D 3/207; B05D 5/06; B05D 7/52; G03G 9/1133; G03G 9/1131; G03G 9/1135; G03G 9/1075; G03G 9/1139; G03G 9/10; G03G 9/1134; G03G 9/1138; G03G 9/1132; G03G 9/107; G03G 9/1137; G03G 9/113
USPC ..... 428/195.1, 204; 283/72, 109, 110, 111, 283/112, 113
See application file for complete search history.

(56) References Cited

U.S. PATENT DOCUMENTS 2,570,856 A 10/1951 Pratt et al. ..... 41/32
3,011,383 A 12/1961 Sylvester et al. ..... 359/584

(Continued)

FOREIGN PATENT DOCUMENTS

AU 488652 11/1977
DE 1696245 1/1972

(Continued)

OTHER PUBLICATIONS

John M. McKiernan et al; "Luminescence and Laser Action of Coumarin Dyes Doped in Silicate and Aluminosilicate Glasses Prepared by Sol-Gel Technique," Journal of Inorganic and Organometallic Polymers, vol. 1, No. 1, 1991, pp. 87-103.

(Continued)

*Primary Examiner* — Norca L Torres Velazquez
(74) *Attorney, Agent, or Firm* — Matthew A. Pequignot; Pequignot+Myers LLC

(57) ABSTRACT

A security image and method of forming said image is disclosed wherein a substrate having an image or indicia thereon is coated with a dilute solution of pigment flakes in an ink or paint. The flakes are subsequently aligned in a magnetic field and are fixed after the field is applied. Most or all of the flakes in a region are aligned so as to be partially upstanding wherein their faces are essentially parallel. Coating the image with flakes yields a latent image which can be clearly seen at a small range of predetermined angles.

20 Claims, 6 Drawing Sheets

Related U.S. Application Data continuation-in-part of application No. 11/028,819, filed on Jan. 4, 2005, now Pat. No. 7,300,695, which is a division of application No. 10/243,111, filed on Sep. 13, 2002, now Pat. No. 6,902,807, application No. 14/038,692, which is a continuation-in-part of application No. 11/687,395, filed on Mar. 16, 2007, now abandoned.

(60) Provisional application No. 60/700,994, filed on Jul. 20, 2005, provisional application No. 60/743,609, filed on Mar. 21, 2006.

(51) Int. Cl.

| | |
|---|---|
| ***B41M 3/14*** | (2006.01) |
| ***G09F 7/04*** | (2006.01) |
| ***G09F 19/14*** | (2006.01) |
| ***B42D 25/00*** | (2014.01) |
| ***B41M 7/00*** | (2006.01) |
| *B05D 3/14* | (2006.01) |
| *B05D 3/00* | (2006.01) |
| *B05D 5/06* | (2006.01) |
| *B05D 7/00* | (2006.01) |

(52) U.S. Cl.
CPC *G09F 7/04* (2013.01); *G09F 19/14* (2013.01); *B05D 3/14* (2013.01); *B05D 3/207* (2013.01); *B05D 5/06* (2013.01); *B05D 7/52* (2013.01)

(56) References Cited

U.S. PATENT DOCUMENTS

| | | | | | |
|---|---|---|---|---|---|
| 3,123,490 | A | | 3/1964 | Bolomey et al. | 106/291 |
| 3,293,331 | A | | 12/1966 | Doherty | 264/131 |
| 3,338,730 | A | | 8/1967 | Slade et al. | 428/142 |
| 3,610,721 | A | | 10/1971 | Abramson et al. | 350/3.5 |
| 3,627,580 | A | | 12/1971 | Krall | 117/238 |
| 3,633,720 | A | | 1/1972 | Tyler | 400/105 |
| 3,640,009 | A | | 2/1972 | Komiyama | 283/88 |
| 3,676,273 | A | | 7/1972 | Graves | 161/3 |
| 3,790,407 | A | | 2/1974 | Merten et al. | 428/148 |
| 3,791,864 | A | | 2/1974 | Steingroever | 427/550 |
| 3,845,499 | A | | 10/1974 | Ballinger | 346/74.3 |
| 3,853,676 | A | | 12/1974 | Graves et al. | 428/207 |
| 3,873,975 | A | | 3/1975 | Miklos et al. | 360/25 |
| 4,011,009 | A | | 3/1977 | Lama et al. | 359/571 |
| 4,054,922 | A | | 10/1977 | Fichter | 346/74.3 |
| 4,066,280 | A | | 1/1978 | LaCapria | 283/91 |
| 4,099,838 | A | | 7/1978 | Cook et al. | 359/537 |
| 4,103,044 | A | * | 7/1978 | Eisenberg et al. | 430/292 |
| 4,126,373 | A | | 11/1978 | Moraw | 359/2 |
| 4,155,627 | A | | 5/1979 | Gale et al. | 359/568 |
| 4,168,983 | A | | 9/1979 | Vittands et al. | 106/14.12 |
| 4,197,563 | A | | 4/1980 | Michaud | 346/74.3 |
| 4,244,998 | A | | 1/1981 | Smith | |
| 4,271,782 | A | | 6/1981 | Bate et al. | 118/623 |
| 4,310,180 | A | | 1/1982 | Mowry, Jr. et al. | 283/67 |
| 4,310,584 | A | | 1/1982 | Cooper et al. | 428/212 |
| 4,398,798 | A | | 8/1983 | Krawczak et al. | 359/573 |
| 4,434,010 | A | | 2/1984 | Ash | 106/415 |
| 4,543,551 | A | | 9/1985 | Peterson | 335/284 |
| 4,657,349 | A | | 4/1987 | Labes et al. | 359/296 |
| 4,668,597 | A | | 5/1987 | Merchant | 430/22 |
| 4,705,300 | A | | 11/1987 | Berning et al. | 283/91 |
| 4,705,356 | A | | 11/1987 | Berning et al. | 359/590 |
| 4,721,217 | A | | 1/1988 | Phillips et al. | 215/230 |
| 4,756,771 | A | | 7/1988 | Brodalla et al. | 148/244 |
| 4,779,898 | A | | 10/1988 | Berning et al. | 283/58 |
| 4,788,116 | A | | 11/1988 | Hochberg | 430/21 |
| 4,838,648 | A | | 6/1989 | Phillips et al. | 359/585 |
| 4,867,793 | A | | 9/1989 | Franz et al. | 106/415 |
| 4,925,215 | A | | 5/1990 | Klaiber | 283/82 |
| 4,930,866 | A | | 6/1990 | Berning et al. | 359/589 |
| 4,931,309 | A | | 6/1990 | Komatsu et al. | 427/599 |
| 5,002,312 | A | | 3/1991 | Phillips et al. | 283/72 |
| 5,009,486 | A | | 4/1991 | Dobrowolski et al. | 359/580 |
| 5,037,101 | A | | 8/1991 | McNulty | 273/139 |
| 5,059,245 | A | | 10/1991 | Phillips et al. | 106/31.65 |
| 5,079,058 | A | | 1/1992 | Tomiyama et al. | 428/41.2 |
| 5,079,085 | A | | 1/1992 | Hashimoto et al. | 428/327 |
| 5,084,351 | A | | 1/1992 | Phillips | 428/411.1 |
| 5,106,125 | A | | 4/1992 | Antes | 283/91 |
| 5,128,779 | A | | 7/1992 | Mallik | 359/2 |
| 5,135,812 | A | | 8/1992 | Phillips et al. | 428/403 |
| 5,142,383 | A | | 8/1992 | Mallik | 359/2 |
| 5,171,363 | A | | 12/1992 | Phillips et al. | 106/31.65 |
| 5,177,344 | A | | 1/1993 | Pease | 235/449 |
| 5,186,787 | A | | 2/1993 | Phillips et al. | 216/36 |
| 5,192,611 | A | | 3/1993 | Tomiyama et al. | 428/354 |
| 5,199,744 | A | * | 4/1993 | Shenton | 282/91 |
| 5,214,530 | A | | 5/1993 | Coombs et al. | 359/359 |
| 5,215,576 | A | | 6/1993 | Carrick | 524/425 |
| 5,223,360 | A | | 6/1993 | Prengel et al. | 430/39 |
| 5,254,390 | A | | 10/1993 | Lu | 428/156 |
| 5,278,590 | A | | 1/1994 | Phillips et al. | 359/589 |
| 5,279,657 | A | | 1/1994 | Phillips et al. | 106/31.65 |
| 5,339,737 | A | | 8/1994 | Lewis et al. | 101/454 |
| 5,364,467 | A | | 11/1994 | Schmid et al. | 106/404 |
| 5,364,689 | A | | 11/1994 | Kashiwagi et al. | 428/195.1 |
| 5,368,898 | A | | 11/1994 | Akedo | 427/510 |
| 5,411,296 | A | | 5/1995 | Mallik | 283/86 |
| 5,424,119 | A | | 6/1995 | Phillips et al. | 428/328 |
| 5,437,931 | A | | 8/1995 | Tsai et al. | 428/446 |
| 5,447,335 | A | | 9/1995 | Haslop | 283/91 |
| 5,464,710 | A | | 11/1995 | Yang | 430/1 |
| 5,474,814 | A | | 12/1995 | Komatsu et al. | 427/549 |
| 5,549,774 | A | | 8/1996 | Miekka et al. | 156/209 |
| 5,549,953 | A | | 8/1996 | Li | 428/64.1 |
| 5,571,624 | A | | 11/1996 | Phillips et al. | 428/403 |
| 5,591,527 | A | | 1/1997 | Lu | 428/411.1 |
| 5,613,022 | A | | 3/1997 | Odhner et al. | 385/37 |
| 5,624,076 | A | | 4/1997 | Miekka et al. | 241/3 |
| RE35,512 | E | | 5/1997 | Nowak et al. | 101/454 |
| 5,627,663 | A | | 5/1997 | Horan et al. | 359/2 |
| 5,629,068 | A | | 5/1997 | Miekka et al. | 428/148 |
| 5,630,877 | A | | 5/1997 | Kashiwagi et al. | 118/623 |
| 5,648,165 | A | | 7/1997 | Phillips et al. | 428/346 |
| 5,650,248 | A | | 7/1997 | Miekka et al. | 430/1 |
| 5,672,410 | A | | 9/1997 | Miekka et al. | 428/148 |
| 5,678,863 | A | * | 10/1997 | Knight et al. | 283/113 |
| 5,700,550 | A | | 12/1997 | Uyama et al. | 428/212 |
| 5,722,693 | A | * | 3/1998 | Wicker | 282/67 |
| 5,742,411 | A | | 4/1998 | Walters | 359/2 |
| 5,744,223 | A | | 4/1998 | Abersfelder et al. | 428/206 |
| 5,763,086 | A | | 6/1998 | Schmid et al. | 428/404 |
| 5,766,738 | A | * | 6/1998 | Phillips et al. | 428/200 |
| 5,811,775 | A | | 9/1998 | Lee | 235/457 |
| 5,815,292 | A | | 9/1998 | Walters | 359/2 |
| 5,838,466 | A | | 11/1998 | Mallik | 359/2 |
| 5,856,048 | A | | 1/1999 | Tahara et al. | 430/1 |
| 5,858,078 | A | | 1/1999 | Andes et al. | 106/437 |
| 5,907,436 | A | | 5/1999 | Perry et al. | 359/576 |
| 5,912,767 | A | | 6/1999 | Lee | 359/567 |
| 5,981,040 | A | | 11/1999 | Rich et al. | 428/209 |
| 5,989,626 | A | | 11/1999 | Coombs et al. | 427/162 |
| 5,991,078 | A | | 11/1999 | Yoshitake et al. | 359/567 |
| 6,013,370 | A | | 1/2000 | Coulter et al. | 428/403 |
| 6,031,457 | A | | 2/2000 | Bonkowski et al. | 340/572.1 |
| 6,033,782 | A | | 3/2000 | Hubbard et al. | 428/407 |
| 6,043,936 | A | | 3/2000 | Large | 359/572 |
| 6,045,230 | A | | 4/2000 | Dreyer et al. | 359/529 |
| 6,068,691 | A | | 5/2000 | Miekka et al. | 106/403 |
| 6,103,361 | A | | 8/2000 | Batzar et al. | 428/323 |
| 6,112,388 | A | | 9/2000 | Kimoto et al. | 29/17.3 |
| 6,114,018 | A | | 9/2000 | Phillips et al. | 428/200 |
| 6,150,022 | A | | 11/2000 | Coulter et al. | 428/403 |
| 6,157,489 | A | | 12/2000 | Bradley, Jr. et al. | 359/584 |
| 6,160,046 | A | | 12/2000 | Bleikolm et al. | 524/284 |
| 6,168,100 | B1 | | 1/2001 | Kato et al. | 251/1 |
| 6,241,858 | B1 | | 6/2001 | Phillips et al. | 204/192.15 |
| 6,242,510 | B1 | | 6/2001 | Killey | 523/204 |
| 6,243,204 | B1 | | 6/2001 | Bradley, Jr. et al. | 359/585 |

(56) References Cited

U.S. PATENT DOCUMENTS

| | | | | |
|---|---|---|---|---|
| 6,403,169 | B1 | 6/2002 | Hardwick et al. | 427/548 |
| 6,549,131 | B1 | 4/2003 | Cote et al. | 340/572.1 |
| 6,586,098 | B1 | 7/2003 | Coulter et al. | 428/403 |
| 6,589,331 | B2 | 7/2003 | Ostertag et al. | 106/460 |
| 6,643,001 | B1 | 11/2003 | Faris | 356/37 |
| 6,649,256 | B1 | 11/2003 | Buczek et al. | 428/323 |
| 6,686,027 | B1 | 2/2004 | Caporaletti et al. | 428/195.1 |
| 6,692,031 | B2 | 2/2004 | McGrew | 283/93 |
| 6,692,830 | B2 | 2/2004 | Argoitia et al. | 428/403 |
| 6,712,399 | B1 | 3/2004 | Drinkwater et al. | 283/111 |
| 6,729,656 | B2 | 5/2004 | Kubert et al. | 283/100 |
| 6,749,777 | B2 | 6/2004 | Argoitia et al. | 252/582 |
| 6,749,936 | B2 | 6/2004 | Argoitia et al. | 428/402 |
| 6,751,022 | B2 | 6/2004 | Phillips | 359/577 |
| 6,759,097 | B2 | 7/2004 | Phillips et al. | 427/510 |
| 6,761,959 | B1 | 7/2004 | Bonkowski et al. | 428/156 |
| 6,808,806 | B2 | 10/2004 | Phillips et al. | 428/403 |
| 6,815,065 | B2 | 11/2004 | Argoitia et al. | 428/403 |
| 6,818,299 | B2 | 11/2004 | Phillips et al. | 428/403 |
| 6,838,166 | B2 | 1/2005 | Phillips et al. | 428/323 |
| 6,841,238 | B2 | 1/2005 | Argoitia et al. | 428/323 |
| 6,901,043 | B2 | 5/2005 | Zhang et al. | 369/275.5 |
| 6,902,807 | B1 | 6/2005 | Argoitia et al. | 428/403 |
| 6,987,590 | B2 | 1/2006 | Phillips et al. | 359/614 |
| 7,029,525 | B1 | 4/2006 | Mehta | 106/31.6 |
| 7,047,883 | B2 | 5/2006 | Raksha et al. | 101/489 |
| 2003/0058491 | A1 | 3/2003 | Holmes et al. | 359/2 |
| 2003/0087070 | A1 | 5/2003 | Souparis | 283/91 |
| 2003/0134939 | A1 | 7/2003 | Vuarnoz et al. | 523/160 |
| 2003/0190473 | A1 | 10/2003 | Argoitia | |
| 2004/0009309 | A1 | 1/2004 | Raksha et al. | 427/598 |
| 2004/0028905 | A1 | 2/2004 | Phillips et al. | 428/404 |
| 2004/0051297 | A1 | 3/2004 | Raksha | 283/57 |
| 2004/0052976 | A1 | 3/2004 | Buczek et al. | 427/598 |
| 2004/0081807 | A1 | 4/2004 | Bonkowski et al. | 428/195.1 |
| 2004/0094850 | A1 | 5/2004 | Bonkowski et al. | 264/1.34 |
| 2004/0100707 | A1 | 5/2004 | Kay et al. | 359/883 |
| 2004/0101676 | A1 | 5/2004 | Phillips | 428/323 |
| 2004/0105963 | A1 | 6/2004 | Bonkowski et al. | 428/195.1 |
| 2004/0151827 | A1 | 8/2004 | Argoitia et al. | 427/7 |
| 2004/0166308 | A1 | 8/2004 | Raksha et al. | 428/329 |
| 2005/0037192 | A1 | 2/2005 | Argoitia et al. | 428/323 |
| 2005/0063067 | A1 | 3/2005 | Phillips et al. | 359/623 |
| 2005/0106367 | A1 | 5/2005 | Raksha et al. | 428/199 |
| 2005/0123755 | A1 | 6/2005 | Argoitia et al. | 428/402 |
| 2005/0128543 | A1 | 6/2005 | Phillips et al. | 359/15 |
| 2005/0133584 | A1 | 6/2005 | Finnerty et al. | 235/375 |
| 2005/0189060 | A1 | 9/2005 | Huang et al. | 156/99 |
| 2006/0035080 | A1 | 2/2006 | Argoitia | 428/402 |
| 2006/0077496 | A1 | 4/2006 | Argoitia | 359/2 |
| 2006/0081151 | A1 | 4/2006 | Raksha et al. | 106/31.92 |
| 2006/0097515 | A1 | 5/2006 | Raksha et al. | 283/91 |
| 2006/0194040 | A1 | 8/2006 | Raksha et al. | 428/323 |
| 2006/0198998 | A1 | 9/2006 | Raksha et al. | 428/323 |
| 2006/0263539 | A1 | 11/2006 | Argoitia | 427/547 |
| 2007/0058227 | A1 | 3/2007 | Raksha et al. | 359/2 |

FOREIGN PATENT DOCUMENTS

| | | |
|---|---|---|
| DE | 3932505 | 4/1991 |
| DE | 4212290 | 5/1993 |
| DE | 4343387 | 6/1995 |
| DE | 19611383 | 9/1997 |
| DE | 19731968 | 1/1999 |
| DE | 19744953 | 4/1999 |
| DE | 19639165 | 10/2003 |
| EP | 0138194 | 10/1984 |
| EP | 0185396 | 12/1985 |
| EP | 0341002 | 11/1989 |
| EP | 0420261 | 4/1991 |
| EP | 0453131 | 10/1991 |
| EP | 0556449 | 8/1993 |
| EP | 0406667 | 1/1995 |
| EP | 0660262 | 1/1995 |
| EP | 0170439 | 4/1995 |
| EP | 0710508 | 5/1996 |
| EP | 0756945 | 2/1997 |
| EP | 0395410 | 8/1997 |
| EP | 0698256 | 10/1997 |
| EP | 0741370 | 5/1998 |
| EP | 0914261 | 5/1999 |
| EP | 0953937 | 11/1999 |
| EP | 0978373 | 2/2000 |
| EP | 1174278 | 1/2002 |
| EP | 1239307 | 9/2002 |
| EP | 1353197 | 10/2003 |
| EP | 1498545 | 1/2005 |
| EP | 1516957 | 3/2005 |
| EP | 1529653 | 5/2005 |
| EP | 1669213 | 6/2006 |
| EP | 1674282 | 6/2006 |
| EP | 1719636 | 11/2006 |
| EP | 1 741 757 | 1/2007 |
| EP | 1745940 | 1/2007 |
| EP | 1760118 | 3/2007 |
| GB | 1107395 | 3/1968 |
| GB | 1131038 | 10/1968 |
| JP | 63172779 | 7/1988 |
| JP | 11010771 | 1/1999 |
| WO | WO88/07214 | 9/1988 |
| WO | 9323251 | 11/1993 |
| WO | 9517475 | 1/1995 |
| WO | WO95/13569 | 5/1995 |
| WO | 9719820 | 6/1997 |
| WO | 9812583 | 3/1998 |
| WO | WO00/08596 | 2/2000 |
| WO | WO01/03945 | 1/2001 |
| WO | WO01/53113 | 7/2001 |
| WO | 0200446 | 1/2002 |
| WO | 0204234 | 1/2002 |
| WO | WO02/40599 | 5/2002 |
| WO | WO02/40600 | 5/2002 |
| WO | 02/053677 | 7/2002 |
| WO | WO02/090002 | 11/2002 |
| WO | WO 03/011980 | 2/2003 |
| WO | WO03/102084 | 12/2003 |
| WO | 2004/007096 | 1/2004 |
| WO | 2004/024836 | 3/2004 |
| WO | 2005/017048 | 2/2005 |
| WO | 2005026848 | 3/2005 |

OTHER PUBLICATIONS

Steve McGrew, "Countermeasures Against Hologram Counterfeiting" Internet site www.ilea.com/nli/publications/countermeasures.htm, Jan. 6, 2000.

Roger W. Phillips, "Optically Variable Films, Pigments, and Inks" SPIE vol. 1323 Optical Thin Films III: New Developments, 1990, pp. 98-109.

I.M. Boswarva et al., "Roll Coater System for the Production of Optically Variable Devices (OVD's) for Security Applications" Proceedings, 33.sup.rd Annual technical Conference, Society of Vacuum Coaters, pp. 103-109 (1990).

"Optical Thin-Film Security Devices", J.A. Dobrowolski, Optical Security Document, Rudolf Van Renesse, Artech House, 1998, pp. 289-328.

R. Domnick et al, "Influence of Nanosized Metal Clusters on the Generation of Strong Colors and Controlling of their Properties through Physical Vapor Deposition (PVD)" 49.sup.th Annual Technical Conference Proceedings (2006), Society of vacuum Coasters.

Van Renesse (Ed.), Optical Document Security, 2.sup.nd Ed., Artech House, 254, 349-369 (1997).

Argoitia et al, "Pigments Exhibiting Diffractive Effects", Soc. of Vac. Coaters, 45.sup.th Annual Tech. Conf. Proceed. (2002).

Trub AG Switzerland, Security and Design Absolute Identity Latent Filter Image: LFI.RTM., 2007, Trub AG, Hintere Bahnhofstrasse 12, CH-5001, Aarau http://www.trueb.ch/generator.aspx?tabindex=3&tabid=105&palias=en.

Alberto Argoitia, "Pigments Exhibiting a Combination of Thin Film and Diffractive Light Interference". AIMCAL Fall Technical Conference, 16.sup.th International Vacuum Web Coating Conference, 2002, pp. 1-9.

(56) References Cited

OTHER PUBLICATIONS www.m-w.com definition of "orientation".*
Jeffrey I. Zink et al, "Optical Probes and Properties of Aluminosilicate Glasses Prepared by the Sol-Gel Method," Polym. Mater. Sci. Eng., pp. 204-208 (1989).
Don W. Tomkins, Kurz Hastings, "Transparent Overlays for Security Printing and Plastic ID Cards" pp. 1-8, Nov. 1997.
The Mearl Corporation Brochure for "Mearl Iridescent Film" Peekskill, NY.
J.A. Dobrowolski et al, "Optical Interference Coatings for Inhibiting of Counterfeiting" Optica Acta, 1973, vol. 20, No. 12, 925-037.
The R.D. Mathis Company Manual for "Thin Film Evaporation Source Reference" Long Beach, CA.
Minolta Manual for "Precise Color Communication, Color Control From Feeling to Instrumentation" pp. 18, 20, 22-23, 46-49.
Frans Defilet, LGZ Landis & Gyr Zug Corporation, "Kinegrams 'Optical Variable Devices' (OVD's) for Banknotes, Security Documents and Plastic Cards" San Diego, Apr. 1-3, 1987.
S.P. McGrew, "Hologram Counterfeiting: Problems and Solutions" SPIE, vol. 1210 Optical Security and Anticounterfeiting Systems, 1990, pp. 66-76.
Rudolf L. van Renese, "Security Design of Valuable Documents and Products" SPIE, vol. 2659, Jun. 1996, pp. 10-20.
Roger W. Phillips et al. "Optical Coatings for Document Security" Applied Optics, vol. 35, No. 28, Oct. 1, 1996 pp. 5529-5534.
J.A. Dobrowolski et al. :Research on Thin Film Anticounterfeiting Coatings at the National Research Council of Canada: Applied Optics, vol. 28, No. 15, Jul. 15, 1989, pp. 2702-2717.
OVD Kinegram Cor "OVD Kinegram Management of Light to Provide Security" Internet site www.kiknegram.com.xhome.html, Dec. 17, 1999.
"Security Enhancement of Holograms with Interference Coatings" by Phillips et al. Optical Security and Counterfeit Deterrence Techniques III Proceedings of SPIE vol. 3973 p. 304-316 (2000).
"Paper Based Document Security—a Review" Rudolf L. van Renesse, European Conference on Security and Detection, Apr. 28-30, 1997, Conference Publication No. 437, p. 75-80.
Diffractive Microstructures for Security Applications: M. T. Gale, Paul Scherrer Institute, Zurich, IEEE Conference Publication London 1991, pp. 205-209, Sep. 16-18, 1991.
Definition of "directly" from Webster's Third New International Dictionary, 1993, p. 641.
J. Rolfe "Optically Variable Devices for use on Bank Notes" SPIE, vol. 1210 Optical Security and Anticounterfeiting Systems, pp. 14-19, 1990.
Halliday et al "Fundamentals of Physics, Sixth Edition", p. 662.
http://www.austriacard.at/main/EN/Products/IndustryAndGoverment/SecurityFeatures/index.html.
Dobrowolski et al., "Research on Thin Film Anticounterfeiting Coatings at the National Research Council of Canada", Applied Optics, vol. 28, No. 14, pp. 2702-2717 (Jul. 15, 1989).
Powell et al, (ED.), Vapor Deposition, John Wiley & Sons, p. 132 (1996).
Prokes et al (Ed.), Novel Methods of Nanoscale Wire Formation, Mat. Research Soc. Bul., pp. 13-14 (Aug. 1999).
Lotz et al., Optical Layers on Large Area Plastic Films, Precision, Applied Films (Nov. 2001).
Argoitia et al, "The concept of printable holograms through the alignment of diffractive pigments", SPIE Conference on Document Security, Jan. 2004.
Himpsel et al, "Nanowires by Step Decoration", Mat. Research Soc. Bul., p. 20-24 (Aug. 1999).
Llewellyn, "Dovids: Functional Beauty—discussion about holography", Paper, Film, and Foil Converter, Aug. 2002.
Hardin, "Optical tricks designed to foil counterfeiters" OE Reports, No. 191, Nov. 1999.
Coombs et al, "Integration of contracting technologies into advanced optical security devices", SPIE Conference on Document Security, Jan. 2004.
Alberto Argoitia and Sean Chu, "The Concept of Printable Holograms Through the Alignment of Diffractive Pigments", Proc. of SPIE-IS&T Electronic Imaging, vol. 5310, 2004, pp. 275-288.

* cited by examiner

Fig. 4a
(Amended)
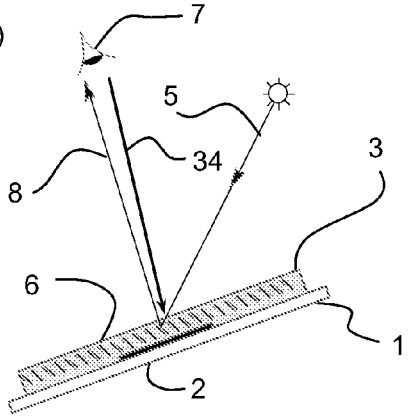

Fig. 6
(Amended)
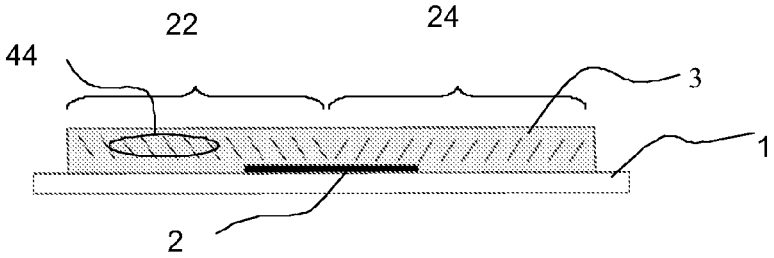

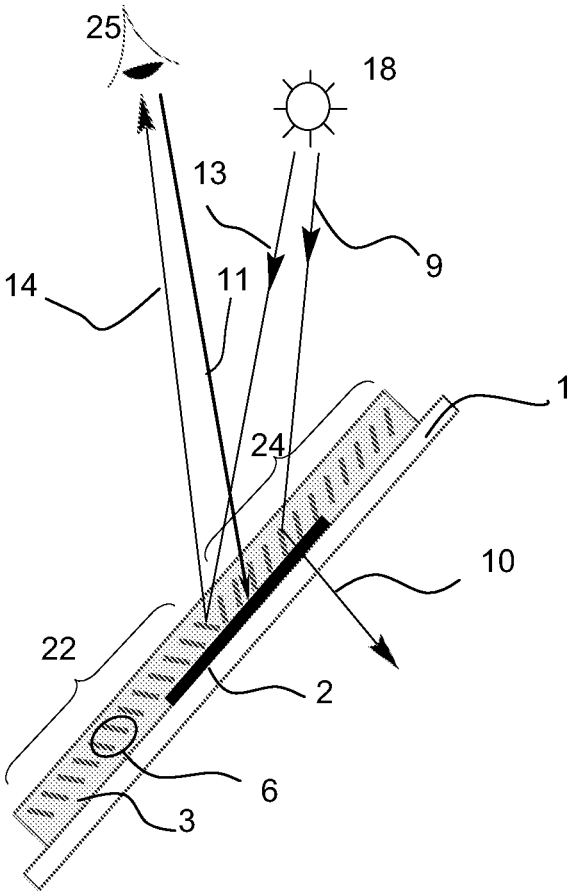
Fig. 7a
(Amended)

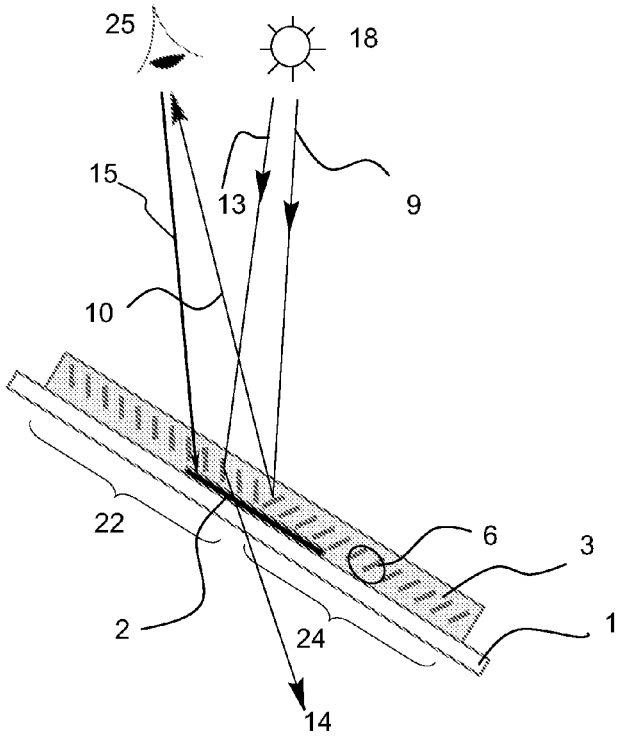
Fig. 8a
(Amended)

PRINTED MAGNETIC INK OVERT SECURITY IMAGE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This application is a continuation-in-part of U.S. patent application Ser. No. 11/415,027 filed May 1, 2006 now U.S. Pat. No. 7,674,501, which claims priority from U.S. Patent application No. 60/700,994 filed Jul. 20, 2005, and is a continuation-in-part of U.S. patent application Ser. No. 11/028,819 filed Jan. 4, 2005 now U.S. Pat. No. 7,300,695, which is a divisional of U.S. patent application Ser. No. 10/243,111 filed Sep. 13, 2002, now U.S. Pat. No. 6,902,807 issued Jun. 7, 2005, which are incorporated herein by reference for all purposes. Also, this application is a continuation-in-part of U.S. patent application Ser. No. 11/687,395 filed Mar. 16, 2007, which claims priority from U.S. Patent application No. 60/743,609 filed Mar. 21, 2006, which are incorporated herein by reference for all purposes.] *This application is a broadening Reissue of U.S. Pat. No. 8,025,952, issued Sep. 27, 2011, which is a continuation-in-part of U.S. patent application Ser. No. 11/415,027, filed May 1, 2006, now U.S. Pat. No. 7,674,501, which claims priority to U.S. Patent Application No. 60/700,994, filed Jul. 20, 2005, and is a continuation-in-part of U.S. patent application Ser. No. 11/028,819, filed Jan. 4, 2005, now U.S. Pat. No. 7,300,695, which is a divisional of U.S. patent application No. 10/243,111, filed Sep. 13, 2002, now U.S. Pat. No. 6,902,807, issued Jun. 7, 2005. Also, this application is a continuation-in-part of U.S. patent application Ser. No. 11/687,395, filed Mar. 16, 2007, which claims priority to U.S. Patent Application No. 60/743,609, filed Mar. 21, 2006. All claims of priority to these patents and applications are hereby made, and each of these patents and applications are hereby incorporated, in their entireties, by reference.*

FIELD OF THE INVENTION

This invention relates generally to a security device and method of forming a security device by coating the surface of a substrate having an image thereon with an ink containing alignable flaked material and exposing the coated surface to a magnetic or electric field so as to align the flaked material within a region covering the image thereby forming a latent image from the image on the device that is highly visible at a predetermined viewing angle.

BACKGROUND OF THE INVENTION

The coating of a substrate with an ink or paint or other similar medium having alignable particles or flakes therein to form an image exhibiting optically-illusive effects is known. Many surfaces painted or printed with flat platelet-like particles show higher reflectance and brighter colors than surfaces coated with a paint or ink containing conventional pigments. Substrates painted or printed with color-shifting flaked pigments show change of color when viewed at different angles. Flaked pigments may contain a material that is magnetically sensitive, so as to be alignable or orientable in an applied magnetic field. Such particles can be manufactured from a combination of magnetic and non-magnetic materials and mixed with a paint or ink vehicle in the production of magnetic paints or inks. A feature of these products is the ability of the flakes to become oriented along the lines of an applied field inside of the layer of liquid paint or ink while substantially remaining in this position after drying or curing of the paint or ink vehicle. Relative orientation of the flake and its major dimension in respect to the coated surface determines the level of reflectance or its direction and, or may determine the chroma of the paint or ink. Alternatively, dielectric material may be alignable in an electric field.

Alignment of magnetic particles along lines of an applied magnetic field has been known for centuries and is described in basic physics textbooks. Such a description is found in a book by Halliday, Resnick, Walker, entitled, Fundamentals of physics. Sixth Edition, p. 662. It is also known to align dielectric particles in an electric field, and this form alignment is applicable to this invention.

The patents hereafter referred to are incorporated herein by reference for all purposes.

U.S. Pat. No. 3,853,676 in the name of Graves et al. describes painting of a substrate with a film comprising film-forming material and magnetically orientable pigment that is oriented in curved configurations and located in close proximity to the film, and that can be seen by the naked eye to provide awareness to the viewer of the location of the film.

U.S. Pat. No. 5,079,058 by Tomiyama discloses a patterned film forming a laminated sheet comprising a multi-layer construction prepared by successively laminating a release sheet layer, a pressure-sensitive adhesive layer, a base sheet layer, and a patterned film layer, or further laminating a pigmented print layer. The patterned film layer is prepared by a process which comprises coating a fluid coating composition containing a powdery magnetic material on one side of the base sheet layer to form a fluid film, and acting a magnetic force on the powdery magnetic material contained in the fluid film, in a fluid state, to form a pattern.

U.S. Pat. No. 5,364,689 in the name of Kashiwagi discloses a method and an apparatus for producing of a product having a magnetically formed pattern. The magnetically formed pattern becomes visible on the surface of the painted product as the light rays incident on the paint layer are reflected or absorbed differently by magnetic particles arranged in a shape corresponding to desired pattern. More particularly, Kashiwagi describes how various patterns, caused by magnetic alignment of nickel flakes, can be formed on the surface of a wheel cover.

U.S. Pat. No. 6,808,806 by Phillips in the name of Flex Products Inc., discloses methods and devices for producing images on coated articles. The methods generally include applying a layer of magnetizable pigment coating in liquid form on a substrate, with the magnetizable pigment coating containing a plurality of magnetic non-spherical particles or flakes. A magnetic field is subsequently applied to selected regions of the pigment coating while the coating is in liquid form, with the magnetic field altering the orientation of selected magnetic particles or flakes. Finally, the pigment coating is solidified, affixing the reoriented particles or flakes in a non-parallel position to the surface of the pigment coating to produce an image such as a three dimensional-like image on the surface of the coating. The pigment coating can contain various interference or non-interference magnetic particles or flakes, such as magnetic color shifting pigments.

U.S. Pat. No. 6,103,361 reveals patterned substrates useful in producing decorative cookware formed by coating a base with a mixture of fluoropolymer and magnetic flakes that magnetically induce an image in the polymer coating composition.

A common feature of the above-mentioned prior art references is a formation of one or more patterns in a painted or printed layer. Typically such patterns include indicia such as symbols, shapes, signs, or letters; and these patterns replicate the shape of a magnetic field often located beneath the substrate and are formed by shadowing contour lines appearing in the layer of paint or ink resulting in particular alignments of magnetic flakes. The desired pattern becomes visible on the surface of the painted product as the light rays incident on the paint layer are reflected or absorbed differently by the subgroup of magnetic non-spherical particles.

Although these prior art references provide some useful and interesting optical effects, there is a need for patterns which have a greater degree of optical illusivity, and which are more difficult to counterfeit. United States patent application number 20050106367, filed Dec. 22, 2004 in the name of Raksha et al. entitled Method and Apparatus for Orienting Magnetic Flakes describes several interesting embodiments which provide optical illusivity, such as a "flip-flop" which may serve as the basis of particular embodiments of this invention. Notwithstanding, there is need to provide different patterns on a single substrate wherein an image in the form or text or a logo, or identifiable feature is printed upon a substrate and wherein a coating of aligned flakes is disposed thereover rendering the image as a latent image that is highly visible when viewing at a first angle and barely visible or not visible at all when viewing the image from another angle.

In the past, attempts to make a hidden image in a security printing have been disclosed, for example in U.S. Pat. Nos. 3,640,009, 4,310,180, and 4,668,597.

A printed hidden image is described at the web site of Austria Card (a subsidiary of the Austrian Central Bank). Related information can be found at:

http://www.austriacard.at/main/EN/Products/IndustryAndGoverment/SecuritFeatures/index.html. The device described is produced by means of a halftone displacement of the hidden image. The printed hidden image is only visible with a special decoding lens.

Latent Filter Image (LFI®)_is manufactured by TRUB (http://www.trueb.ch/en/products/national/rohkarte.php). The LFI® is like a hidden image which has an integrated decoding filter. Tilting the card displays an inverted image.

Although this printed hidden image is interesting and appears to perform its intended function, it is quite complex and costly to produce and requires registration of a filter with a region supporting the printed hidden image.

It is an object of this invention to form a security device that has a latent image thereon that can be detected or seen at certain viewing angles and which is difficult to see at other angles. Complex instructions are not required to see the latent image. One only has to tilt the image from one direction to another to see the image appear or essentially disappear.

SUMMARY OF THE INVENTION

In accordance with an aspect of the invention, there is provided, a security device comprising a substrate supporting a latent image; and a coating of particles in a carrier supported by the substrate and covering the latent image and aligned in such a manner as to obscure the latent image when viewing the security device from a first angle, and to reveal the latent image when viewing the security device from a second different angle.

In accordance with a further aspect of this invention an image is provided coated over with aligned flakes or particles wherein the image is highly visible at a first viewing angle and wherein the image is much less visible at most other angles of viewing.

In accordance with a further aspect of the invention there is provided, a security device comprising:

a) a substrate supporting an image having a first color different from a color of the substrate;

b) a coating of particles in a carrier having a second color that is different from the first color supported by the substrate and covering the image thereby forming a latent image, wherein said particles are aligned in such a manner as to obscure the image forming a latent image when viewing the security device from a first angle, and to reveal the image when viewing the security device from a second different angle, and wherein the latent image has a color at a first viewing angle that is different than the first color and that is different than the second color.

In accordance with another aspect of the invention a method is disclosed comprising the steps of:

providing a substrate having discernible information thereon; and covering the discernible information with a coating of pigment flakes in a carrier and aligning the pigment flakes such that a majority of the flakes are aligned parallel to other flakes, wherein the concentration of flakes within the carrier is dilute enough such that the at least some of the discernible information can be seen at a predetermined viewing angle and wherein the same discernible information cannot be seen or is obscured at other viewing angles.

BRIEF DESCRIPTION OF THE DRAWINGS

Exemplary embodiments of the invention will now be described in conjunction with the drawings in which:

FIG. 4a is a schematic illustration of the device of FIG. 3 and shows a light source incident upon the coating of flakes and apparent lack of visibility of image obscured by the flakes.

FIG. 4b shows an almost absence of the letters US only faintly visible due to the angle of incidence of the light source and angle of viewing shown in FIG. 4a.

FIG. 6 is a cross-sectional view of an embodiment of the device having a coating over a printed image, wherein the flakes are aligned in two groups or regions of parallel flakes oriented differently, forming a "flip-flop".

FIG. 7a is a cross-sectional view of the device shown in FIG. 6 illustrating the angle of incident light and the angle of view.

FIGS. 8a and 8b are the same as FIGS. 7a and 7b with the exception of the angle of incident light upon the device and the image that is viewed; now the S is highly visible and the U is essentially obscured.

DETAILED DESCRIPTION

Within this specification the term "magnetically aligned particles aligned in parallel to one another is meant to be mean particles or flakes that have their faces "substantially parallel" or "as parallel as possible".

Figure 2:
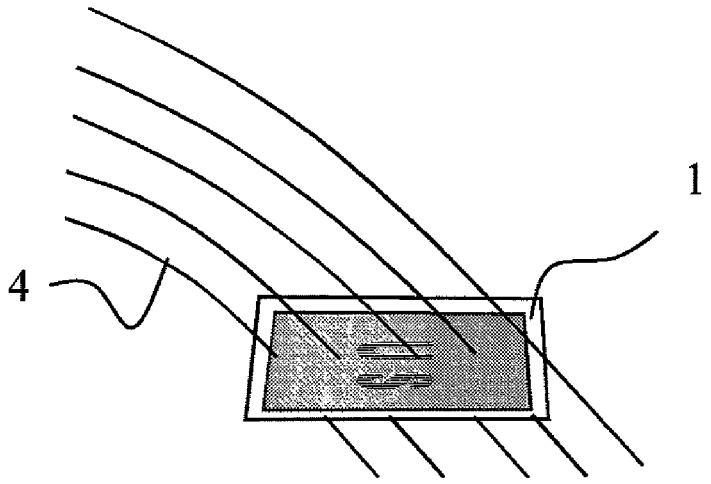
FIG. 2 is a drawing showing the security device of FIG. 1 having the coating thereon and illustrating the field lines emanating from below the device from an applied field.

For example, as can be seen in FIG. 2 field lines propagating through the substrate are "nearly" parallel. Therefore the term parallel, used hereafter is to include "nearly" parallel, or being parallel so as to allow text under the "nearly parallel" flakes to be seen clearly at a particular viewing angle without being substantially obscured.

The term latent image is to mean an image that is present but can only be clearly seen at certain angles of viewing and which is substantially obscured at other viewing angles.

This invention relates to printing with a semi-transparent ink containing magnetic platelets on the top of a substrate with a previously printed graphic image or text and alignment of the particles at an angle to the plane of the first image such that the tilt of the substrate to this particular angle relatively the observer would allow observation of the previously printed image through the top print and would not allow such observation at different angles. The term "printing" includes printing with a print-head, silk screen printing, painting or coating.

Figure 1:
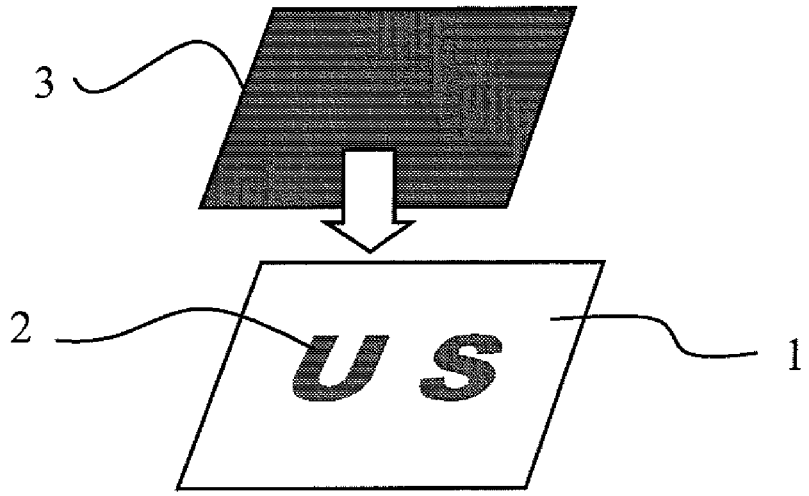
FIG. 1 is a schematic drawing illustrating the formation of a security device in accordance with the invention wherein a substrate having an image in the form of printed matter thereon is coated with particles and magnetically so as to be substantially parallel.

Referring now to FIG. 1 the sequence of fabrication of a security device in accordance with this invention is shown. In FIG. 1 the substrate 1 is first printed with the text 2 bearing the letters U S. Of course any indicia or discernible image 2 may be printed upon substrate 1, and the text U S is exemplary. Furthermore, it is within the scope of this invention to use a light transmissive substrate and to print the image 2 on either side of the substrate with the coating of flakes on the same or other side. In FIG. 1, the text is overprinted as is shown in FIG. 1 with the layer of magnetic ink 3, having particles that are alignable in a magnetic field 4. After applying the coating of magnetic ink 3, the entire structure is placed in a magnetic field 4 as shown in FIG. 2. The printed, coated, substrate 1 is placed in the field with parallel magnetic lines 4 shown propagating through the substrate wherein the lines are nearly parallel to each other.

Figure 3:
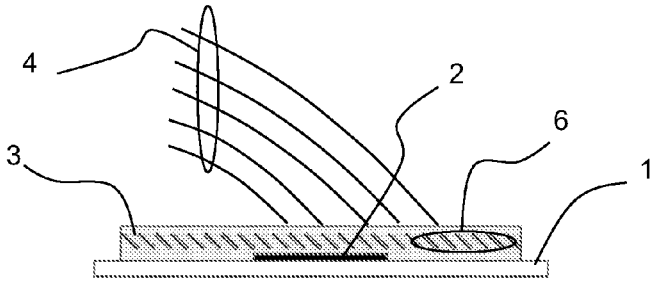
FIG. 3 is a detailed cross-sectional view of the device shown in FIG. 2 wherein the image is shown covered by flakes aligned in parallel covering the image.

Magnetic particles or flakes 6, dispersed in the ink, align themselves along magnetic lines 4 as shown in FIG. 3. Here the substrate 1 is printed with the text image 2 and over printed with magnetic ink 3. The particles 6 are rotated in the wet ink under the influence of magnetic force when they become aligned along magnetic lines 4. The flakes in a binder for example of UV curable carrier are then cured, for example with UV light to fix the particles in a desirable position.

Figure 4B:
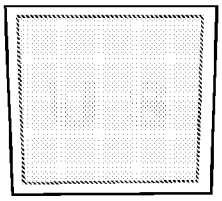
Figure 5A:
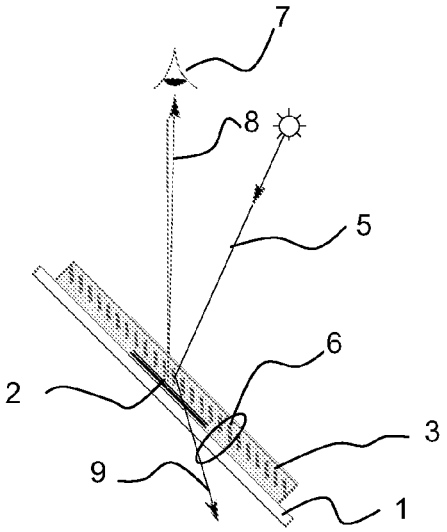
FIGS. 5a and 5b are similar to FIGS. 4a and 4b, however due to the angle of incidence and angle of viewing, the letters US are highly visible and a substantially unobscured.
Figure 5B:
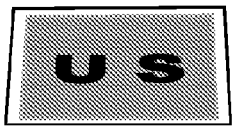

In FIG. 4a, when the image printed on the substrate 1 with the text 2 and the layer of magnetic ink 3 is observed at normal angle [4] *34* or tilted with its upper edge toward the observer, aligned magnetic particles 6 reflect incident light 5 in the direction 8 of the observer 7 making the surface of the print very reflective. The text 2 is still visible through the ink because the ink concentration is not high enough to provide complete coverage of under-printed text but it is large enough to make it barely visible as shown in FIG. 4b. When the image is tilted with its upper edge away from the observer as shown in FIG. 5a, the magnetic particles have a different angular position relative to the distant light source and relative to the observer. In this instance, the incident light 5 is reflected from and between the magnetic particles in the direction 9 and this light is scattered inside of the print. The opening among the particles at this particular observation angle is much larger than in FIG. 4a and the observer is able to see much more of the text image 2 as shown in FIG. 5b. The text is seen as exemplified in FIG. 5b as a text image that is much darker than the text in FIG. 4a. The layer of magnetic ink in FIG. 5b looks much darker than in FIG. 4b because the incident light 5 is reflected into the print away from the observer.

Many other printed images with optical effects generated by alignment of pigment particles in an applied magnetic field are suitable for fabrication of latent prints.

Depending upon the concentration and size of the flakes, the physical bases of the latent image appearance and disappearance may vary slightly. For example the latent image when viewed from one particular angle may be barely noticeable and from another angle essentially looking into the edges of the flakes as in FIG. 5a, may be highly visible. In other instances based on flake size and concentration and alignment angle, the image may be totally obscured at one angle and very visible at another small range of angles.

Although various configurations of magnetic fields can be used to align the flakes, it is preferable that a substantially large region, for example a region covering at least a single letter or symbol to be viewed or obscured have the flakes substantially parallel to one another.

Another example of an optical effect with magnetic particles aligned in a V-shaped magnetic field is shown in FIG. 6. This arrangement of flakes is described in detail in U.S. Pat. No. 7,047,883. Referring now to FIG. 6, the substrate is printed with the text image 2, overprinted with magnetic ink consisting of the ink vehicle 3 and magnetic particles 6 and exposed to the V-shaped field to align the particles along the field lines. The center line of the V-shaped field was purposefully positioned in the middle of the text 2. Magnetic particles [4] *44* of the ink area 22 are aligned at a predetermined angle to the particles in area 24. The angle between the particles of these two adjacent areas was set by the applied magnetic hardware described in U.S. Pat. No. 7,047,883. In an alternative embodiment not shown, instead of a V-shaped field a Λ-shaped field can be used.

Figure 7B:
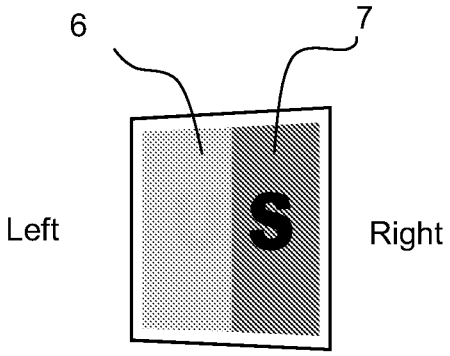
FIG. 7b shows a region of the device of FIG. 7a having the letter U as highly visible and the region with the letter S nearly totally obscured.

As can be seen from FIGS. 7a and 7b, observations of the combined print on the substrate demonstrate a different appearance of the latent text printed underneath the magnetic ink. The tilt of the combined print in one particular direction with respect to positions of incident light and an observer shows that only half of the under-printed text becomes visible. In the FIG. 7a, where the cross-section of a printed insignia is shown, the substrate 1 with the text image 2 and the ink vehicle 3 containing dispersed and aligned particles 6 is tilted with its left side 22 away from the observer [5] *25*. Region 22 of the ink 3 contains magnetic particles oriented at a different angle to the particles in the region 24. Incident light, coming from the distant source [8] *18* in the directions 9 and 13 and falling on the top of magnetic ink, is reflected differently in these two adjacent areas 22 and 24 of the magnetic print where the particles are aligned at predetermined angles. The portion 10 of the light coming in from the direction 9 reflects into the print in the direction of the substrate 1.

As a result, part of the print 24 appears dark in FIG. 7b. However, at this particular angle of the tilt, the inclination of the particles is coincident with the observation direction of the print and the text image 2 becomes visible. Therefore, the right half of the under-printed text image 2 becomes visible to the observer [5] *25* through the layer of the ink in the direction 11 in FIG. 7a. Another portion of the light [8] falls in the direction 13 on the region 22 of the substrate where magnetic particles are reflecting it in the direction 14 toward the observer [5] *25*. This part of the overt printed magnetic ink looks bright as is shown in FIG. 7b. The particles of the magnetic ink block the under-printed text image 2 making it barely visible as shown in FIG. 7b.

Figure 8B:
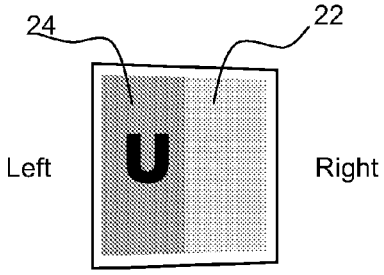

When the print is tilted in the opposite direction as shown in FIG. 8a the particles 6 in the area 24 of the print reflects the majority of incident light from the direction 9 from the light source [8] *18* in the direction 10 to the observer [5] *25*. The portion of the light arriving from the source [8] *18* in the direction 13 propagates through the ink vehicle between the pigment particles toward the substrate 1 and the printed image 2 in the direction 14. As a result, the left part (region 22) of the text image 2 in FIG. 8b becomes visible surrounded by a dark area. The right part of the print becomes bright and reflective. The text image is now barely visible in the right part of the print. This flip-flop effect is due to the different parallel alignment of the flakes in the two parts of the image.

Other printed images, fabricated by printing on a substrate an informative text image or a graphical image and overprinted with ink containing magnetic particles aligned in an applied shaped magnetic field, also show a printed latent image visible through various optical effects generated in magnetic fields. For example, optical effects, generated in a hemispheric, semi-cylindrical magnetic fields, or other magnetic fields with a predetermined shape of magnetic lines penetrating through the layer of wet magnetic ink, show covert features similar to those described above. Certain areas of the under-printed image appear through the cover-printed magnetic ink at different observation angles.

Figure 9:
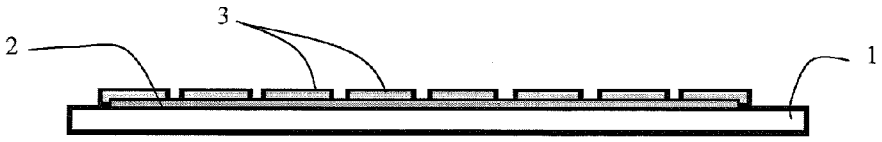
FIG. 9 is a cross sectional view of a security device in accordance with the invention wherein an image printed or coated on a substrate is subsequently coated with a coating of discrete lines obscuring the image at some viewing angles and allowing the image to be seen at another angle of incidence.
Figure 10A:
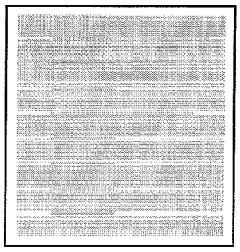
FIGS. 10a and 10b show the device of FIG. 9 as viewed from two different angles wherein the image of the letter F is obscured in FIG. 10a and is visible in FIG. 10b.
Figure 10B:
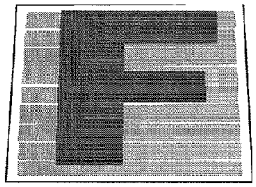

Visibility of the under-printed image can be changed by changing its contrast to the substrate. For instance the image can be printed white on the black substrate or printed black on the white substrate. The image can be colored and the substrate can be with another color. The ink vehicle of magnetic ink can also be colored or clear. Specific colors of the substrate, the under-printed image and the ink vehicle can be selected to provide the best visibility of the latent image. Example of such a color fit is shown in FIG. 9. The substrate 1 is printed with image 2 in the form of a letter F. Magnetic ink 3 is printed on the top of the image 2 in a discontinuous manner with interruptions in the form of bars as shown in FIGS. 9 and 10. The substrate 1 is white, the under-print 2 is yellow and the magnetic ink vehicle is blue. Appearance of the completed print at normal observation angle is shown in FIG. 10a. The bright light-blue stripes form a square on the surface of the substrate with very narrow yellow lines. When the substrate with the print is tilted with its upper edge away from the observer, a green image of the F appears in the square of dark blue stripes. The upper layer of the semi-transparent magnetic ink can be printed with a tessellated pattern on the top of the solid coated under-print. For some prints, both layers may have matched patterns.

The pigment of the magnetic ink can be silver-like, colored, or color-shifting. Silver-like pigment is generally fabricated by deposition of reflective metal (Al, Ag) on the surface of magnetic flake. Colored pigments with metallic reflectance can be fabricated either by vacuum or chemical deposition of colored reflecting metals and materials (Cu, Au, $TiN_x$, $ZrN_x$, $NbO_x$, etc.) on the surface of magnetic platelet. Alternatively, colored pigments with high color performance can be fabricated by vacuum deposition of multi-layered structure Ab/D/R/M/R/D/Ab where Ab is semi-transparent absorber, D is transparent dielectric of predetermined thickness, R is opaque reflector (Al in most of the cases), M is magnetic material. Alternatively the particles may be silver-like or colored diffractive structure as described in U.S. Pat. No. 6,902,807. Other particles may have a structure of irregular low-frequency binary gratings without appearance of diffractive colors. The typical size of the particles for the ink is in the range of 10-100 microns, more preferably in the range of 18-30 microns. The flakes may be purposefully shaped to have a same, particular shape, for example, square-shaped. In this manner the aligned flakes are more predictably oriented to show or to obscure the indicia or image disposed thereunder.

We found that the concentration of the magnetic particles dispersed in the ink vehicle should be in the range of 2-30 wt %, more preferably in the range of 5-15 wt. %. In many instances the choice of concentration depends upon the thickness and weight of the pigment and the thickness of printed layer of the ink and further depends on upon the method of printing.

In summary, this invention provides an additional measure of security in addition to security only afforded to images formed of magnetically aligned flakes. Furthermore, combining a printed image and a magnetically aligned coating provides an unexpected synergy from these two printing methods.

What is claimed is:

1. A security device comprising:

a) a substrate [supporting] *having* an image *thereon*;

b) a coating of flakes [supported by the substrate and] *in a carrier,* covering the image thereby forming a latent image[.]*;*

*wherein a first group of said flakes are aligned in a substantially same orientation at a first partially upstanding flake angle relative to said image, and wherein a second group of said flakes are aligned in a substantially same orientation at a second partially upstanding flake angle relative to said image;*

[wherein said flakes are aligned in such a manner as to obscure the image forming a] *wherein the concentration of flakes within the carrier is dilute enough and said first partially upstanding flake angle and said second partially upstanding flake angle are oriented such that said* latent image *is obscured* when [viewing the security device] *said security device is viewed* from a first *viewing* angle, and [to reveal the image when viewing the] *said latent image is revealed when said* security device *is viewed* from a second *viewing angle,* different *from the first viewing* angle[, wherein the coating of flakes includes a carrier supporting the flakes and wherein the concentration of flakes within the carrier is dilute enough so as to allow the latent image to be seen or to be obscured as the substrate is tilted from one direction to another, wherein a first group of the flakes are aligned in a substantially same orientation and wherein a second group of the flakes are oriented in a substantially same orientation that differs from the orientation of the first group of flakes].

2. A security device as defined in claim 1 [wherein the first group of flakes overlies a first symbol and wherein a second group of flakes overlies a second symbol] *wherein said first partially upstanding flake angle of said first group of flakes*

*has an orientation that differs from the orientation of said second partially upstanding flake angle of said second group of flakes.*

[3. A security device as defined in claim 2, wherein the first symbol is obscured while the second symbol is revealed when viewing the substrate at a first predetermined angle.]

[4. A security device as defined in claim 2, wherein the first symbol is revealed while the second symbol is obscured when viewing the substrate at a second different predetermined angle.]

5. A security device as defined in claim 1, wherein the flakes are at least one of color shifting, diffractive, reflective, absorbing and color switching.

6. A security device as defined in claim 1, wherein the [latent] image is printed with pigment flakes that are oriented so as to be parallel with the substrate.

7. A security device as defined in claim 5 wherein the flakes are opaque.

8. A security device as defined in claim 1, wherein the coating is over at least 80% of the image and wherein regions of the image are uncoated with the coating.

9. A security device as defined in claim 8 wherein the substrate, the image and the coating are different colors and wherein the color of at least one of the image, the coating and the substrate change with a change of viewing angle.

10. A security device as defined in claim 1, wherein the coating forms a tessellated [plane] *pattern*.

11. A security device as defined in claim 1, wherein the flakes are electrically or magnetically aligned flakes.

12. A security device as defined in claim 1, wherein the image is printed upon the substrate and wherein the coating of flakes is coated over the [latent] image on a same side of the substrate.

[13. A security device as defined in claim 1, wherein the substrate is transparent and wherein the coating of flakes is coated on a first side of the substrate and wherein the latent image is on a second side of the substrate.]

14. A security device as defined in claim 1, wherein the device exhibits at least 70% of reflectance of light incident thereon when the latent image is obscured, and wherein the device exhibits less than 40% of light incident thereon when the latent image is revealed.

15. A security device as defined in claim 1, wherein the latent image is text.

16. A security device as defined in claim 1, wherein the latent image includes one or more symbols, or a logo.

17. A security device as defined in claim 1, wherein the [substrate] *image* is printed with an ink or paint and wherein the latent image is formed by an absence of ink or paint on the [printed] substrate.

18. A security device as defined in claim 1, wherein the particles are flakes and wherein at least 80% of the flakes have a same shape.

*19. A security device as defined in claim 1 wherein the first group of flakes overlies a first symbol and wherein a second group of flakes overlies a second symbol.*

*20. A security device as defined in claim 19 wherein the first symbol is obscured while the second symbol is revealed when viewing the substrate at a first predetermined angle.*

*21. A security device as defined in claim 1 wherein said first and said second groups of flakes overlie a first symbol.*

*22. A security device comprising: a substrate;*

*a coating covering an image located on said substrate, said coating comprising a carrier carrying a plurality of magnetically aligned flakes;*

*wherein said magnetically aligned flakes are aligned in a substantially same orientation and are tilted, relative to said image, at a partially upstanding angle; and*

*wherein said magnetically aligned flakes cover said latent image in a dilute enough concentration, and are so aligned at said partially upstanding angle, such that said latent image is obscured when said security device is viewed from a first angle, and said latent image is revealed when said security device is viewed from a second, different angle.*

*23. A security device as defined in claim 19, wherein the first symbol is revealed while the second symbol is obscured when viewing the substrate at a second different predetermined angle.*

* * * * *